United States Patent
Kim et al.

(10) Patent No.: US 9,397,335 B2
(45) Date of Patent: Jul. 19, 2016

(54) BIMODAL TYPE ANODE ACTIVE MATERIAL AND LITHIUM SECONDARY BATTERY INCLUDING THE SAME

(71) Applicant: LG Chem, Ltd., Seoul (KR)

(72) Inventors: Ye Ri Kim, Daejeon (KR); Je Young Kim, Daejeon (KR); Byung Hun Oh, Daejeon (KR); Hyun Woong Yun, Daejeon (KR)

(73) Assignee: LG Chem, Ltd. (KR)

( * ) Notice: Subject to any disclaimer, the term of this patent is extended or adjusted under 35 U.S.C. 154(b) by 170 days.

(21) Appl. No.: 14/043,347

(22) Filed: Oct. 1, 2013

(65) Prior Publication Data
US 2014/0027679 A1    Jan. 30, 2014

Related U.S. Application Data (63) Continuation of application No. PCT/KR2013/006222, filed on Jul. 11, 2013.

(30) Foreign Application Priority Data

Jul. 13, 2012  (KR) .................. 10-2012-0076901
Jul. 10, 2013  (KR) .................. 10-2013-0081007

(51) Int. Cl.
| | |
|---|---|
| *H01M 4/88* | (2006.01) |
| *H01M 4/485* | (2010.01) |
| *H01M 4/36* | (2006.01) |
| *H01M 4/525* | (2010.01) |
| *H01M 4/131* | (2010.01) |
| *H01M 4/62* | (2006.01) |
| *H01M 4/02* | (2006.01) |

(52) U.S. Cl.
CPC .............. *H01M 4/485* (2013.01); *H01M 4/364* (2013.01); *H01M 4/525* (2013.01); *H01M 4/131* (2013.01);
(Continued)

(58) Field of Classification Search
CPC ............ C01P 2004/51; C01P 2004/53; C01P 2004/64; H01M 4/131; H01M 4/485
USPC ................. 252/182.1, 507; 429/221, 231.95; 977/773
See application file for complete search history.

(56) References Cited

U.S. PATENT DOCUMENTS

| | | | |
|---|---|---|---|
| 2008/0020279 A1* | 1/2008 | Schmidt et al. | ............... 429/221 |
| 2011/0086248 A1 | 4/2011 | Nakura | |

(Continued)

FOREIGN PATENT DOCUMENTS

| | | |
|---|---|---|
| EP | 1057783 A2 | 12/2000 |
| JP | 2002008658 A | 1/2002 |

(Continued)

OTHER PUBLICATIONS

International Search Report for PCT/KR2013/006222, dated Oct. 10, 2013.

*Primary Examiner* — Khanh Tuan Nguyen
(74) *Attorney, Agent, or Firm* — Lerner, David, Littenberg, Krumholz & Mentlik, LLP

(57) ABSTRACT

Provided is an anode active material including a compound of Chemical Formula 1 below that may realize a high-density electrode and may simultaneously improve adhesion to the electrode and high rate capability, wherein the compound of Chemical Formula 1 includes first primary particles and secondary particles, and a ratio of the first primary particles to the secondary particles is in a range of 5:95 to 50:50:

$$Li_xM_yO_z \quad \text{[Chemical Formula 1]}$$

where M is any one independently selected from the group consisting of titanium (Ti), tin (Sn), copper (Cu), lead (Pb), antimony (Sb), zinc (Zn), iron (Fe), indium (In), aluminum (Al), and zirconium (Zr) or a mixture of two or more thereof; and x, y, and z are determined according to an oxidation number of M.

16 Claims, 2 Drawing Sheets

○ : FIRST PRIMARY PARTICLE
◉ : SECONDARY PARTICLE (52) U.S. Cl.
    CPC .............. *H01M 4/621* (2013.01); *H01M 4/622* (2013.01); *H01M 4/624* (2013.01); *H01M 2004/021* (2013.01); *Y02E 60/122* (2013.01); *Y10T 428/2982* (2015.01)

(56) References Cited

U.S. PATENT DOCUMENTS

| | | |
|---|---|---|
| 2011/0151327 A1 | 6/2011 | Imanari |
| 2011/0311875 A1 | 12/2011 | Lee et al. |
| 2012/0052391 A1 | 3/2012 | Suzuki et al. |
| 2012/0261622 A1 | 10/2012 | Honma |

FOREIGN PATENT DOCUMENTS

| | | | | |
|---|---|---|---|---|
| JP | 2006054159 A | 2/2006 | | |
| JP | 2009-037807 | * | 2/2009 | ............ H01M 10/36 |
| KR | 2012-0076335 A | 7/2012 | | |
| WO | 2010058990 A2 | 5/2010 | | |
| WO | WO 2010-058990 A2 | * | 5/2010 | .............. H01M 4/04 |
| WO | 2011078112 A1 | 6/2011 | | |

* cited by examiner

FIG. 1

○ : FIRST PRIMARY PARTICLE
◉ : SECONDARY PARTICLE

FIG. 2

○ : FIRST PRIMARY PARTICLE
◉ : SECONDARY PARTICLE

FIG. 3

BIMODAL TYPE ANODE ACTIVE MATERIAL AND LITHIUM SECONDARY BATTERY INCLUDING THE SAME

CROSS-REFERENCE TO RELATED APPLICATIONS

This application is a continuation of International Application No. PCT/KR2013/006222 filed on Jul. 11, 2013, which claims priority to Korean Patent Application Nos. KR 10-2012-0076901 and KR 10-2013-0081007, filed Jul. 13, 2012 and Jul. 10, 2103 respectively, the disclosures of which are incorporated herein by reference in their entirety.

TECHNICAL FIELD

The present invention relates to a bimodal type anode active material and a lithium secondary battery including the same, and more particularly, to an anode active material, in which particles constituting the anode active material include a mixture of primary particles and secondary particles, and a lithium secondary battery including the same.

BACKGROUND ART

A lithium ion secondary battery is a type of secondary batteries that operates by the principle of generating a battery as lithium ions move between a cathode and an anode. Components of the lithium secondary battery may be broadly categorized as a cathode, an anode, a separator, and an electrolyte. A cathode active material and an anode active material among the components may have a structure, in which lithium in an ionic state may be intercalated into and deintercalated from the active materials, and charge and discharge may be performed by a reversible reaction.

Typically, lithium metal has been used as an anode active material of a lithium secondary battery. However, since there is a risk of explosion because a battery short circuit may occur due to the formation of dendrites when the lithium metal is used, a carbon-base material has been widely used as an anode active material instead of the lithium metal.

Examples of the carbon-based material may be crystalline carbon, such as graphite and artificial graphite, and amorphous carbon, such as soft carbon and hard carbon. The amorphous carbon may have high capacity, but irreversibility may be high during a charge and discharge process. Graphite is typically used as the crystalline carbon and has a high theoretical capacity limit. However, even through the crystalline carbon or the amorphous carbon has relatively high theoretical capacity, the theoretical capacity is only about 380 mAh/g. Thus, it may be difficult to use the crystalline carbon or the amorphous carbon as an anode during the development of a high capacity lithium battery.

Therefore, research into using lithium titanium oxide (LTO), spinel-structured metal oxide, as an anode active material has recently been actively conducted in order to develop a lithium ion secondary battery having battery performance, such as high speed charge and discharge and long lifetime.

Since the LTO does not generate a solid electrolyte interface (SEI) layer which is generated due to a secondary reaction between a graphite-based anode active material and an electrolyte that are now commonly used in a lithium ion secondary battery, the LTO may be excellent in terms of the occurrence of irreversible capacity in comparison to graphite and may have excellent reversibility for the intercalation and deintercalation of lithium ions even during repetitive charge and discharge cycles. Also, since the LTO has a relatively stable structure, it is a promising material that may manifest long lifetime performance of a secondary battery.

The LTO may be classified as two types, in which the LTO is only composed of primary particles and the LTO is composed of secondary particles that are formed by the agglomeration of the primary particles. In the case that the LTO is composed of the primary particles, adhesion to an electrode may not be problematic when the LTO has an appropriate particle diameter, but charge and discharge characteristics may degrade. Therefore, in the case in which the particle diameter of the prepared LTO is 300 nm or less in order to complement such shortcomings and improve high rate capability, limitations in a process during the preparation of a slurry may occur due to the increase in a specific surface area. Also, in the case that the secondary particles are formed in order to address the limitations of the nano-primary particles, improvement of the limitations may be obtained. However, a large amount of a binder may be required in order to maintain the adhesion to the electrode. Since the binder may act as an electrical resistive element of the electrode, a total energy density of the battery may be finally decreased.

In addition, in line with the improvement of the function of a device using a battery, a battery having a high energy density has been required. In order to satisfy this requirement, a technique that may increase energy per unit volume is required. In order to improve the energy per unit volume, a high-density electrode may be formed by increasing an amount of an electrode material to be coated per unit volume, and thus, a battery having high energy may be formed.

Therefore, an active material that may improve electrode density by decreasing the amount of the binder is required.

DISCLOSURE OF THE INVENTION

Technical Problem

According to an aspect of the present invention, the present invention provides an anode active material that may secure high rate capability of a battery and high density of an electrode as well as adhesion to the electrode.

Technical Solution

According to aspects of the present invention, there are provided a bimodal type anode active material, in which particles constituting the anode active material include a mixture of first primary particles and secondary particles, and an anode and a lithium secondary battery that include the bimodal type anode active material.

Advantageous Effects

An anode active material, in which first primary particles and secondary particles are mixed in an appropriate ratio, is used, and thus, a high-density electrode may not only be obtained, but adhesion to the electrode and high rate capability may also be simultaneously improved.

MODE FOR CARRYING OUT THE INVENTION

The present invention relates to an anode active material including a compound of Chemical Formula 1 below, wherein the compound of Chemical Formula 1 includes first primary particles and secondary particles, and a weight ratio of the first primary particles to the secondary particles is in a range of 5:95 to 50:50:

$Li_xM_yO_z$     [Chemical Formula 1]

where M is any one independently selected from the group consisting of titanium (Ti), tin (Sn), copper (Cu), lead (Pb), antimony (Sb), zinc (Zn), iron (Fe), indium (In), aluminum (Al), and zirconium (Zr) or a mixture of two or more thereof; and x, y, and z are determined according to an oxidation number of M.

According to an embodiment of the present invention, an anode active material, in which the first primary particles and the secondary particles are mixed in an appropriate ratio, is used, and thus, a high-density electrode may not only be obtained, but adhesion to the electrode and high rate capability may also be simultaneously improved.

Figure 1:
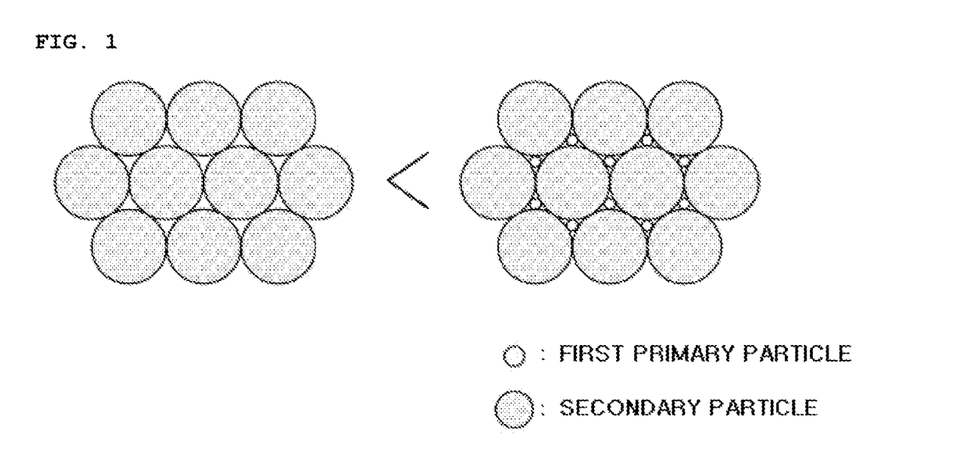
FIG. 1 is schematic view illustrating an anode active material, in which an appropriate amount of first primary particles is mixed with secondary particles, according to an embodiment of the present invention.
Figure 2:
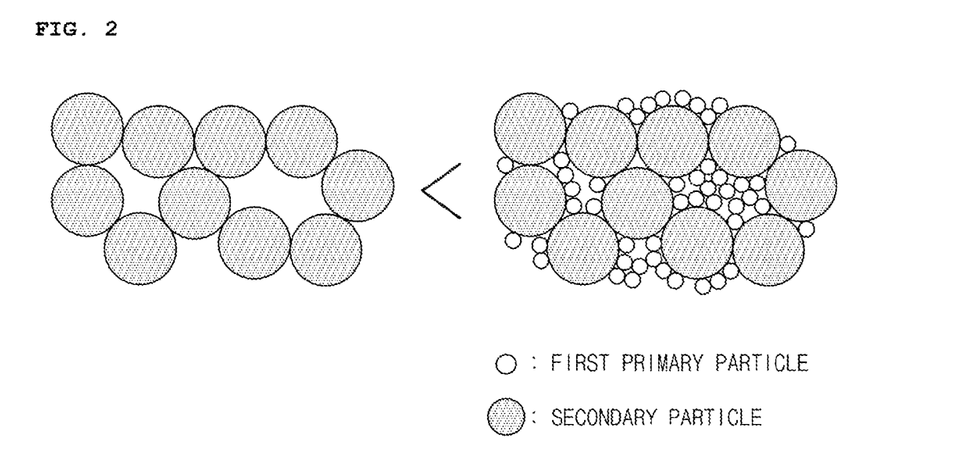
FIG. 2 is schematic view illustrating an anode active material, in which a large amount of first primary particles is mixed with secondary particles.

FIG. 1 is schematic view illustrating an anode active material according to an embodiment of the present invention, in which an appropriate amount of first primary particles is mixed with secondary particles, and FIG. 2 is schematic view illustrating an anode active material, in which a large amount of first primary particles is mixed with secondary particles.

Referring to FIGS. 1 and 2, in both cases in which the appropriate amount of the first primary particles is mixed and the large amount of the first primary particles is mixed, the first primary particles may fill pores between the secondary particles. However, optimum performance in the adhesion and high rate capability as well as electrode density may be simultaneously satisfied in the case that the first primary particles and the secondary particles are appropriately mixed as illustrated in FIG. 1.

According to an embodiment of the present invention, an average particle diameter ($D_{50}$) of the first primary particles is in a range of 10 nm to 3 µm, may be in a range of 100 nm to 1 µm, and for example, may be in a range of 100 nm to 700 nm.

In the case that the average particle diameter of the first primary particles is less than 10 nm, there may be practical difficulties in processing, and in the case in which the average particle diameter is greater than 3 µm, since the diameter of the first primary particles is relatively large, an effect of improving the high rate capability due to the first primary particles may not be expected.

In the case that the lithium metal oxide particles are only composed of the first primary particles and used as an anode active material of a lithium secondary battery, the adhesion to the electrode may not be problematic, but charge and discharge characteristics may degrade. The first primary particles may be prepared to have a smaller diameter in order to overcome the above limitations. However, in this case, limitations in a process during the preparation of a slurry, such as an increase in product costs due to the use of a large amount of a binder and a decrease in electrical conductivity, may occur due to the increase in a specific surface area.

Therefore, according to an embodiment of the present invention, an anode active material, in which first primary particles of lithium metal oxide and secondary particles are mixed in an appropriate ratio, is used in order to address the above limitations in the case of only using the first primary particles, and thus, a high-density electrode may not only be obtained, but adhesion to the electrode and high rate capability may also be simultaneously improved.

According to an embodiment of the present invention, a mixing ratio of the first primary particles to the secondary particles is in a range of 5:95 to 50:50(weight ratio) and may be in a range of 5:95 to 40:60.

When the amount of the first primary particles is greater than the above range, the electrode density may increase, but the adhesion to the electrode and the high rate capability of the secondary battery may decrease. Also, when the amount of the first primary particles is smaller than the above range, the pores between the secondary particles may not be filled with the first primary particles, and thus, a desired effect of the present invention may not be obtained.

The lithium metal oxide particles according to an embodiment of the present invention are secondary particles, in which two or more second primary particles are agglomerated, and may be porous particulates.

According to an embodiment of the present invention, when the two or more second primary particles are agglomerated to form the secondary particle, a specific surface area is relatively smaller than the case in which the second primary particles are not agglomerated and individually included. Thus, the adhesion to the electrode may be better.

In the present invention, an internal porosity of the secondary particles may be in a range of 3% to 15%, an average particle diameter ($D_{50}$) thereof may be in a range of 5 µm to 30 µm, and a specific surface area (Brunauer-Emmett-Teller (BET)) thereof may be in a range of 1 m²/g to 15 m²/g.

In the case that the internal porosity of the secondary particles is less than 3%, practical difficulties in processing may occur in consideration of the fact that the secondary particles are formed by the agglomeration of the second primary particles. In the case in which the internal porosity of the secondary particles is greater than 15%, the amount of the binder required to maintain the appropriate adhesion to the electrode may increase, and thus, the conductivity may be reduced and the capacity may be decreased.

According to an embodiment of the present invention, the internal porosity of the secondary particles may be defined below:

Internal porosity=volume of pores per unit mass/(specific volume+volume of pores per unit mass)

The measurement of the internal porosity is not particularly limited. According to an embodiment of the present invention, the internal porosity, for example, may be measured by using absorption gas, such as nitrogen, and BEL-SORP (BET instrument) by BEL Japan, Inc.

Similarly, the specific surface area (BET) of the secondary particles may be in a range of 1 m²/g to 15 m²/g.

In the present invention, the specific surface areas of the first primary particles and the secondary particles may be measured by a BET method. For example, the specific surface area may be measured by a 6-point BET method according to a nitrogen gas adsorption-flow method using a porosimetry analyzer (Belsorp-II mini by Bell Japan Inc.).

The average particle diameter ($D_{50}$) of the secondary particles is in a range of 5 µm to 30 µm and may be in a range of 5 μm to 12 μm. The average particle diameter ($D_{50}$) of the second primary particles constituting the secondary particles is in a range of 100 nm to 1 μm and may be in a range of 100 nm to 700 nm.

In the present invention, the average particle diameter ($D_{50}$) may be defined as a particle diameter at 50% in a cumulative particle diameter distribution. The average particle diameters ($D_{50}$) of the first and second primary particles and the secondary particles according to the embodiment of the present invention, for example, may be measured by using a laser diffraction method. The laser diffraction method may generally measure a particle diameter ranging from a submicron level to a few mm, and may obtain highly repeatable and high resolution results.

Typically, since the lithium metal oxide have low conductivity, it is advantageous to have a small average particle diameter in order to be applied to a cell for fast charging. However, in this case, a large amount of the binder is required in order to maintain appropriate electrode adhesion due to the increase in the specific surface area as described above.

That is, in the case that the average particle diameter of the secondary particles is less than 5 μm, the amount of the binder required to maintain the desired electrode adhesion may increase due to the increase in the specific surface area of the anode active material, and as a result, the reduction of the conductivity of the electrode may occur. In the case in which the average particle diameter of the secondary particles is greater than 30 μm, fast charging characteristics may degrade.

Therefore, in the case that the high-density anode active material according to the embodiment of the present invention includes the secondary particles having an average particle diameter ranging from 5 μm to 30 μm, the amount of the binder required to maintain the electrode adhesion may not only be decreased, but fast charging characteristics may also be improved by increasing an area, in which a direct reaction with lithium (Li) ions may be possible.

In the case that the average particle diameter of the second primary particles is less than 100 nm, there may be difficulties in processing of preparing the average particle diameter less than 100 nm, and since the porosity of the secondary particles formed by the agglomeration of the second primary particles may not only decrease but the penetration of lithium ions into the secondary particles may be difficult, the second primary particles in the secondary particles may not participate in a charge and discharge reaction. In the case in which the average particle diameter of the second primary particles is greater than 1 μm, the formability of the secondary particles may decrease and granulation may be difficult to be controlled.

According to an embodiment of the present invention, the compound of Chemical Formula 1 may include one or more lithium titanium oxides selected from the group consisting of $Li_4Ti_5O_{12}$, $Li_2TiO_3$, $Li_2Ti_3O_7$, and a compound of Chemical Formula 2 below:

$$Li_{x'}Ti_{y'}O_4 \qquad \text{[Chemical Formula 2]}$$

where $0.5 \leq x' \leq 3$ and $1 \leq y' \leq 2.5$.

Also, the compound of Chemical Formula 2 may be $LiTi_2O_4$.

In a method of preparing an anode active material according to an embodiment of the present invention, first primary particles of the lithium metal oxide are first prepared by a typical method and secondary particles of the lithium metal oxide particles may be formed by a separate granulation process after the preparation of second primary particles. However, the secondary particles may be typically prepared by a method of preparing second primary particles and simultaneously agglomerating the second primary particles through a single process. Thereafter, the anode active material according to the present invention may be prepared by uniformly mixing the prepared first primary particles and secondary particles.

In the method of preparing an anode active material according to the embodiment of the present invention, a lithium salt and metal oxide are added to a volatile solvent, and stirred and sintered. Then, the first primary particles may be obtained by grinding and sieving.

Specifically, the lithium salt is dissolved in the volatile solvent and titanium oxide, as the metal oxide, is then added thereto while being stirred. Then, the solution thus prepared is sintered at a temperature ranging from about 500° C. to about 1000° C. for about 1 hour to about 15 hours. Thereafter, the first primary particles may be prepared by grinding and sieving.

Herein, the volatile solvent, for example, may be water, acetone, or alcohol.

Also, the lithium salt may be any one selected from the group consisting of lithium hydroxide, lithium oxide, and lithium carbonate, or a mixture of two or more thereof.

Also, in the method of preparing an anode active material according to the embodiment of the present invention, a method of preparing the secondary particles may include preparing a precursor solution by adding a lithium salt and metal oxide to a volatile solvent and stirring, providing the precursor solution into a chamber of a spray dryer, and spraying the precursor solution in the chamber and drying.

In this case, the lithium salt, the metal oxide, and the volatile solvent may be used by selecting the same material as used in the preparation of the first primary particles.

According to an embodiment of the present invention, the secondary particles of the lithium metal oxide particles may be formed by a separate granulation process after the preparation of the second primary particles. However, the secondary particles may be typically prepared by a method of preparing second primary particles and simultaneously agglomerating the second primary particles through a single process.

Examples of the above method may include a spray drying method. Hereinafter, a method of preparing the secondary particles according to the embodiment of the present invention will be described using the spray drying method as an example.

The preparation method according to the embodiment of the present invention may include providing the precursor solution into the chamber that is included in the spray dryer.

A typically used spray dryer may be used as the above spray dryer, and for example, an ultrasonic spray dryer, an air nozzle spray dryer, an ultrasonic nozzle spray dryer, a filter expansion aerosol generator, or an electrostatic spray dryer may be used. However, the present invention is not limited thereto.

According to an embodiment of the present invention, a feed rate of the precursor solution into the chamber may be in a range of 10 ml/min to 1,000 ml/min. In the case that the feed rate is less than 10 ml/min, the average particle diameter of the agglomerated second primary particles may decrease and thus, the formation of the high-density secondary particles may be difficult. In the case in which the feed rate is greater than 1,000 ml/min, since the average particle diameter of the secondary particles may relatively increase, realization of desired high rate capability may be difficult.

Furthermore, the method of preparing the secondary particles according to the embodiment of the present invention may include spraying the precursor solution in the chamber and drying.

The precursor solution may be sprayed through a disc rotating at a high speed in the chamber and the spraying and the drying may be performed in the same chamber.

In addition, the average particle diameter and internal porosity of the present invention may be realized by controlling spray drying conditions, for example, flow of carrier gas, retention time in a reactor, and internal pressure.

According to an embodiment of the present invention, the internal porosity of the secondary particles may be controlled by the adjustment of drying temperature, and the drying may be performed at a temperature ranging from 20° C. to 300° C. However, the drying may be performed at a temperature as low as possible for the high density of the secondary particles.

According to an embodiment of the present invention, the first primary particles and the secondary particles are mixed in a weight ratio ranging from 5:95 to 50:50 and may be mixed in a weight ratio ranging from 5:95 to 40:60, and thus, an anode active material having high rate capability of the battery and high density of the electrode as well as adhesion to the electrode secured may be prepared. In this case, in order to mix the first primary particles and the secondary particles as best as possible, the first primary particles and the secondary particles may be uniformly mixed by using a typical milling method, such as a planetary mill.

The lithium metal oxide including the first primary particles and the secondary particles according to the embodiment of the present invention may be included in an amount of 50 wt % to 100 wt % based on a total weight of the anode active material. The case that the amount of the lithium metal oxide is 100 wt % based on the total weight of the anode active material denotes a case where the anode active material is only composed of the lithium metal oxide.

In a secondary battery according to an embodiment of the present invention, the anode active material may further include at least one active material selected from the group consisting of carbon-based materials that are typically used in an anode active material, transition metal oxides, silicon (Si)-based materials, and Sn-based materials, in addition to the lithium metal oxide. However, a type of the anode active material is not limited thereto.

The present invention also provides an anode active material composition including the anode active material, a conductive agent, and a binder, and the anode active material, the conductive agent, and the binder may be included in a weight ratio of 80:3:7 to 90:9:13.

The present invention may also provide an anode including the anode active material composition, and a lithium secondary battery including the anode.

An anode active material composition including the anode active material is mixed with a solvent, such as N-methylpyrrolidone (NMP), to coat an anode current collector, and the anode may then be prepared by drying and rolling the anode current collector.

The anode current collector is not particularly limited so long as it does not generate chemical changes in the battery as well as having high conductivity. Examples of the anode current collector may be copper, stainless steel, aluminum, nickel, titanium, sintered carbon, copper or stainless steel surface treated with carbon, nickel, titanium, or silver, aluminum-cadmium alloy, etc. Fine irregularities may also be formed on a surface of the anode current collector to increase the adhesion of the anode active material, and the anode current collector may be used in various forms, such as a film, sheet, foil, net, porous body, foam, or nonwoven fabric.

The conductive agent is not particularly limited so long as it does not generate chemical changes in the battery as well as having conductivity. Examples of the conductive agent may be graphite such as natural graphite and artificial graphite; carbon black such as acetylene black, Ketjen black, channel black, furnace black, lamp black, and thermal black; conductive fibers such as carbon fibers and metal fibers; metal powder such as fluorocarbon powder, aluminum powder and nickel powder; conductive whiskers such as zinc oxide whiskers and potassium titanate whiskers; conductive metal oxide such as titanium oxide; a conductive material such as a polyphenylene derivative, etc.

Examples of the binder may be polyvinylidene fluoride (PVdF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene-butadiene rubber, fluorine rubber, various copolymers, etc.

For example, a cathode current collector is coated with a cathode slurry including a cathode active material, and the cathode included in the lithium secondary battery of the present invention may then be prepared by drying the cathode current collector. The cathode slurry, if necessary, may include the above-described components.

In particular, as the cathode active material, the lithium secondary battery may use a layered compound, such as lithium cobalt oxide ($LiCoO_2$) or lithium nickel oxide ($LiNiO_2$), or a compound substituted with one or more transition metals; lithium manganese oxides such as $Li_{1+x}Mn_{2-x}O_4$ (where x is 0 to 0.33), $LiMnO_3$, $LiMn_2O_3$, and $LimnO_2$; lithium copper oxide ($Li_2CuO_2$); vanadium oxides such as $LiV_3O_8$, $LiFe_3O_4$, $V_2O_5$, and $Cu_2V_2O_7$; nickel (Ni)-site type lithium nickel oxides expressed by a chemical formula of $LiNi_{1-x}M_xO_2$ (where M is cobalt (Co), manganese (Mn), Al, Cu, Fe, magnesium (Mg), boron (B), or gallium (Ga), and x is 0.01 to 0.3); lithium manganese complex oxides expressed by a chemical formula of $LiMn_{2-x}M_xO_2$ (where M is Co, Ni, Fe, chromium (Cr), Zn, or tantalum (Ta), and x is between 0.01 and 0.1) or $Li_2Mn_3MO_8$ (where M is Fe, Co, Ni, Cu, or Zn); $LiMn_2O_4$ having a part of Li substituted with alkaline earth metal ions; a disulfide compound; or $Fe_2(MoO_4)_3$. However, $LiNi_xMn_{2-x}O_4$ (where x is 0.01 to 0.6) may be used, and for example, $LiNi_{0.5}Mn_{1.5}O_4$ or $LiNi_{0.4}Mn_{1.6}O_4$ may be used. That is, in the present invention, spinel lithium manganese complex oxide of $LiNi_xMn_{2-x}O_4$ (where x is 0.01 to 0.6) having relatively high potential due to the high potential of the anode active material may be used as the cathode active material.

The present invention also provides a battery module including the lithium secondary battery as a unit cell, and a battery pack including the battery module.

Any battery case typically used in the art may be selected as a battery case used in the present invention. A shape of the lithium secondary battery according to the use thereof is not limited, and for example, a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells. Preferred examples of the medium and large sized device may be an electric vehicle, a hybrid electric vehicle, a plug-in hybrid electric vehicle, or a power storage system, but the medium and large sized device is not limited thereto.

Hereinafter, the present invention will be more fully described according to specific embodiments. The present invention may, however, be embodied in many different forms and should not be construed as being limited to the embodiments set forth herein.

EXAMPLES

Preparation Example 1

Preparation of First Primary Particles $LiOH \cdot H_2O$ and $TiO_2$ (anatase) were mixed at a molar ratio of 4:5. A mixture was dissolved in pure water, and a solution was then stirred and sintered at 750° C. for about 3 hours. First primary particles having an average particle diameter ($D_{50}$) of 700 nm was prepared by grinding and sieving.

Preparation Example 2

Preparation of Secondary Particles $LiOH \cdot H_2O$ and $TiO_2$ (anatase) were mixed at a molar ratio of 4:5. A mixture was dissolved in pure water and a solution was then stirred. In this case, a ratio of a total solid material was defined as a weight of a total solid content included in the solution to a total weight of the solution, and a precursor solution was prepared by adjusting the solid content to 30% and stirring. The precursor solution was provided into a chamber of a spray dryer (by EIN SYSTEMS, Co., Ltd.). Then, the precursor solution was sprayed in the chamber and dried. The spray drying were performed under conditions including a drying temperature of 130° C., an internal pressure of −20 mbar, and a feed rate of ml/min, and a $Li_4Ti_5O_{12}$ secondary particles having an average particle diameter of 5.4 μm and an internal porosity of 3.5% was then prepared by sintering the precursor thus obtained at 800° C. in air.

Example 1

The first primary particles and the secondary particles that were prepared in Preparation Examples 1 and 2 were mixed in a weight ratio of 5:95 by using a planetary mill to prepare an anode active material.

Example 2

An anode active material was prepared in the same manner as Example 1 except that the first primary particles and the secondary particles were mixed in a weight ratio of 10:90.

Example 3

An anode active material was prepared in the same manner as Example 1 except that the first primary particles and the secondary particles were mixed in a weight ratio of 20:80.

Example 4

An anode active material was prepared in the same manner as Example 1 except that the first primary particles and the secondary particles were mixed in a weight ratio of 30:70.

Example 5

An anode active material was prepared in the same manner as Example 1 except that the first primary particles and the secondary particles were mixed in a weight ratio of 40:60.

Example 6

An anode active material was prepared in the same manner as Example 1 except that the first primary particles and the secondary particles were mixed in a weight ratio of 50:50.

Comparative Example 1

An anode active material was prepared by only using the first primary particles obtained in Preparation Example 1.

Comparative Example 2

An anode active material was prepared by only using the secondary particles obtained in Preparation Example 2.

Comparative Example 3

An anode active material was prepared in the same manner as Example 1 except that the first primary particles and the secondary particles were mixed in a weight ratio of 60:40.

Comparative Example 4

An anode active material was prepared in the same manner as Example 1 except that the first primary particles and the secondary particles were mixed in a weight ratio of 3:97.

Example 7

<Anode Preparation>

The anode active material of Example 1 as an anode active material, carbon black (Super P) as a conductive agent, and PVdF as a binder were mixed in a weight ratio of 84:6:10, and the mixture was then added to N-methyl-2-pyrrolidone as a solvent to prepare a slurry. One surface of a copper current collector was coated with the prepared slurry to a thickness of 65 μm, and then dried and rolled. Then, anodes were prepared by punching into a predetermined size.

<Lithium Secondary Battery Preparation>

Ethylene carbonate (EC) and diethyl carbonate (DEC) were mixed in a volume ratio of 30:70 to prepare a non-aqueous electrolyte solvent, and $LiPF_6$ was added thereto to prepare a 1 M $LiPF_6$ non-aqueous electrolyte solution.

Also, a lithium foil was used as a counter electrode, i.e., a cathode, and a polyolefin separator was disposed between both electrodes. Then, coin-type half cells were prepared by injecting the electrolyte solution.

Examples 8 to 12 and Comparative Examples 5 to 8

Anodes having compositions of the following Table 1 were prepared by using the anode active materials that were obtained in Examples 2 to 6 and Comparative Examples 1 to 4.

TABLE 1

| Category | Anode composition (anode active material:conductive agent:binder) (weight ratio) |
|---|---|
| Example 7 | 84 (first primary particles 5:secondary particles 95):6:10 |
| Example 8 | 84 (first primary particles 10:secondary particles 90):6:10 |
| Example 9 | 84 (first primary particles 20:secondary particles 80):6:10 |
| Example 10 | 84 (first primary particles 30:secondary particles 70):6:10 |
| Example 11 | 84 (first primary particles 40:secondary particles 60):6:10 |
| Example 12 | 84 (first primary particles 50:secondary particles 50):6:10 |
| Comparative Example 5 | 84 (only first primary particles):6:10 |
| Comparative Example 6 | 84 (only secondary particles):6:10 |
| Comparative Example 7 | 84 (first primary particles 60:secondary particles 40):6:10 |
| Comparative Example 8 | 84 (first primary particles 3:secondary particles 97):6:10 |

Experimental Example 1

<Adhesion Measurement>

Adhesion to an anode was measured using the anodes prepared during the preparation of the lithium secondary batteries of Examples 7 to 12 and Comparative Examples 5 to 8. The adhesion measurement was performed using a generally known 180-degree peel test. The results thereof are presented in Table 2 below.

Experimental Example 2

<High Rate Capability Analysis>

In order to analyze high rate capabilities of the lithium secondary batteries of Examples 7 to 12 and Comparative Examples 5 to 8, the high rate capabilities of the lithium secondary batteries were evaluated by sequentially changing charge and discharge rates to 0.1 C, 0.2 C, 0.5 C, 1 C, 0.2 C, 2 C, 0.2 C, 5 C, 0.2 C, and 10 C, respectively. In this case, a charge end voltage was set as 1.0 V and a discharge end voltage was set as 2.5 V. The high rate capability for each lithium secondary battery was expressed as a percentage value of a capacity measured at 10 C with respect to a capacity at 0.1 C.

The results thereof are presented in Table 2 below.

TABLE 2

| Category | Electrode composition (active material:conductive agent:binder) | Adhesion (gf) | High rate capability [%, 10 C/0.1 C] |
|---|---|---|---|
| Example 7 | 84 (first primary particles 5:secondary particles 95):6:10 | 36 | 66.5 |
| Example 8 | 84 (first primary particles 10:secondary particles 90):6:10 | 35.5 | 69 |
| Example 9 | 84 (first primary particles 20:secondary particles 80):6:10 | 34.4 | 73 |
| Example 10 | 84 (first primary particles 30:secondary particles 70):6:10 | 33 | 82 |
| Example 11 | 84 (first primary particles 40:secondary particles 60):6:10 | 30 | 79 |
| Example 12 | 84 (first primary particles 50:secondary particles 50):6:10 | 21 | 70 |
| Comparative Example 5 | 84 (only first primary particles):6:10 | 7.6 | 73 |
| Comparative Example 6 | 84 (only secondary particles):6:10 | 35.9 | 65 |
| Comparative Example 7 | 84 (first primary particles 60:secondary particles 40):6:10 | 12 | 63.5 |
| Comparative Example 8 | 84 (first primary particles 3:secondary particles 97):6:10 | 35 | 64 |

As illustrated in Table 2, in the case that lithium titanium oxides, which were formed by mixing the first primary particles and the secondary particles, were used in the anodes as in Examples 7 to 12, it was confirmed that adhesion and high rate capability were simultaneously improved.

However, even in the case in which the anode active materials having the first primary particles and the secondary particles mixed therein were used as in Comparative Examples 7 and 8, it may be confirmed that adhesion and high rate capability of the same level as Examples 7 to 12 of the present invention were not simultaneously satisfied when an excessive amount or relatively small amount of the primary particles was used.

In the case that lithium titanium oxide only formed of the first primary particles was used as an active material as in Comparative Example 5, it was confirmed that adhesion was significantly decreased, and in the case in which lithium titanium oxide only formed of the secondary particles was used in the anode as in Comparative Example 6, it was confirmed that high rate capability was decreased.

According to the results of Experimental Examples 1 and 2, it may be estimated that manifestation of the high rate capability of the first primary particles may be related to the fact that the first primary particles had excellent accessibility between lithium titanium oxide and lithium ions in the electrolyte during the manifestation of the high rate capability in comparison to the secondary particles. Also, since the specific surface area of the secondary particles was lower than that of the lithium titanium oxide that was only composed of the first primary particles, it was considered that it may be correlated with the electrode adhesion.

Experimental Example 3

<Electrode Density>

Figure 3:
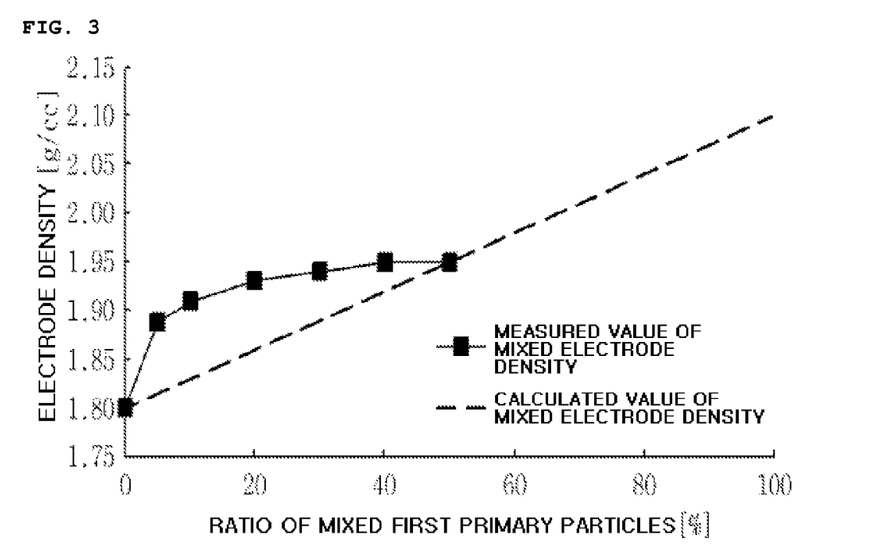
FIG. 3 is a graph illustrating electrode density according to a mixing ratio of first primary particles that are used in anodes of Examples 7 to 12 according to an embodiment of the present invention.

Electrode density of an anode was measured using the anodes prepared during the preparation of the lithium secondary batteries of Examples 7 to 12 and Comparative Examples 5 to 8. The results thereof are presented in Table 3 below, and the electrode density according to a ratio of the mixed first primary particles is illustrated in FIG. 3.

TABLE 3

| Category | Electrode composition (active material:conductive agent:binder) | Electrode density [g/cc] |
|---|---|---|
| Example 7 | 84 (first primary particles 5:secondary particles 95):6:10 | 1.89 |

TABLE 3-continued

| Category | Electrode composition (active material:conductive agent:binder) | Electrode density [g/cc] |
|---|---|---|
| Example 8 | 84 (first primary particles 10:secondary particles 90):6:10 | 1.91 |
| Example 9 | 84 (first primary particles 20:secondary particles 80):6:10 | 1.93 |
| Example 10 | 84 (first primary particles 30:secondary particles 70):6:10 | 1.94 |
| Example 11 | 84 (first primary particles 40:secondary particles 60):6:10 | 1.95 |
| Example 12 | 84 (first primary particles 50:secondary particles 50):6:10 | 1.95 |
| Comparative Example 5 | 84 (only first primary particles):6:10 | 2.1 |
| Comparative Example 6 | 84 (only secondary particles):6:10 | 1.8 |
| Comparative Example 7 | 84 (first primary particles 60:secondary particles 40):6:10 | 1.96 |
| Comparative Example 8 | 84 (first primary particles 3:secondary particles 97):6:10 | 1.8 |

As illustrated in Table 3, in the case that lithium titanium oxides, in which the first primary particles and the secondary particles were mixed in a specific mixing ratio, were used in the anodes as in Examples 7 to 12, it may be confirmed that electrode densities were significantly improved in comparison to Comparative Examples 6 to 8.

Also, as illustrated in FIG. 3, with reference to the electrode densities of the anode without the first primary particles as in Comparative Example 6 and the anode only having the first primary particles as in Comparative Example 5 (dotted line: calculated values of mixed electrode density in a graph of FIG. 3), it may be confirmed that the electrode densities of Examples 7 to 12 were rapidly increased in comparison to the calculated values of mixed electrode density.

However, an increased amount of the electrode density was decreased as the ratio of the mixed first primary particles increased, and thus, it was confirmed that the electrode density of an anode, in which lithium titanium oxide having the first primary particles and the secondary particles mixed therein was used as an anode active material, was similar to an average value of the electrode densities of the anode only having the primary particles and the anode only having the secondary particles when the ratio of the first primary particles approached 50%.

That is, in the case that the lithium titanium oxide having the first primary particles and the secondary particles mixed therein was used as an anode active material, an effect of improving the electrode density may be obtained even in the case in which a small amount of the first primary particles was mixed.

With respect to the anodes of Examples 7 to 12, in which lithium titanium oxides having the first primary particles and the secondary particles mixed therein were used as an anode active material, the electrode densities were increased. It may be estimated that the reason for this was due to the fact that the electrode density may be increased by filling the pores between the secondary particles, which may be generated when the electrode was formed by only using the secondary particles as an active material, with the lithium titanium oxides having a structure of the first primary particles.

That is, when comparing the electrodes and the secondary batteries of Examples 7 to 12, in which the first primary particles and the secondary particles were mixed, with the electrodes and the secondary batteries of Comparative Examples 7 and 8, it may be confirmed that the first primary particles and the secondary particles may be mixed in an appropriate ratio in order to obtain optimum performance in the adhesion and high rate capability.

INDUSTRIAL APPLICABILITY

Since an anode active material, in which first primary particles and secondary particles are mixed in an appropriate ratio, is used, high-density electrode may not only be obtained, but adhesion to the electrode and high rate capability may also be simultaneously improved. Thus, the anode active material may be suitable for a lithium secondary battery.

The invention claimed is:

1. An anode active material, comprising:
   first primary particles of a compound represented by Chemical Formula 1; and
   secondary particles of a compound represented by Chemical Formula 1,
   wherein a weight ratio of the first primary particles to the secondary particles ranges from 5:95 to 50:50,
   wherein the secondary particles are agglomerates of two or more second primary particles of a compound represented by Chemical Formula 1:

$$Li_xM_yO_z$$ [Chemical Formula 1]

where M is any one independently selected from the group consisting of titanium (Ti), tin (Sn), copper (Cu), lead (Pb), antimony (Sb), zinc (Zn), iron (Fe), indium (In), aluminum (Al), and zirconium (Zr) or a mixture of two or more thereof; and x, y, and z are determined according to an oxidation number of M,
   wherein an average particle diameter ($D_{50}$) of the first primary particles is in a range of 10 nm to 3 μm,
   wherein an average particle diameter ($D_{50}$) of the secondary particles is in a range of 5 μm to 30 μm, and
   wherein an internal porosity of the secondary particles is in a range of 3% to 15%.

2. The anode active material of claim 1, wherein a weight ratio of the first primary particles to the secondary particles is in a range of 5:95 to 40:60.

3. The anode active material of claim 1, wherein the average particle diameter ($D_{50}$) of the first primary particles is in a range of 100 nm to 1 μm.

4. The anode active material of claim 1, wherein an average particle diameter ($D_{50}$) of the second primary particles is in a range of 100 nm to 1 μm.

5. The anode active material of claim 1, wherein the average particle diameter ($D_{50}$) of the secondary particles is in a range of 5 μm to 12 μm.

6. The anode active material of claim 1, wherein the compound represented by Chemical Formula 1 comprises one or more lithium titanium oxides selected from the group consisting of $Li_4Ti_5O_{12}$, $Li_2TiO_3$, $Li_2Ti_3O_7$, and a compound represented by Chemical Formula 2 below:

$$Li_{x'}Ti_{y'}O_4$$ [Chemical Formula 2]

where $0.5 \leq x' \leq 3$ and $1 \leq y' \leq 2.5$.

7. The anode active material of claim 6, wherein the compound represented by Chemical Formula 2 is $LiTi_2O_4$.

8. An anode active material composition comprising the anode active material of claim 1, a conductive agent, and a binder.

9. The anode active material composition of claim 8, wherein the anode active material, the conductive agent, and the binder are included in a weight ratio of 80:3:7 to 90:9:13.

10. The anode active material composition of claim 8, wherein the conductive agent is at least one selected from the group consisting of graphite; carbon black; conductive fibers; metal powder; conductive whiskers; conductive metal oxide; and a polyphenylene derivative.

11. The anode active material composition of claim 8, wherein the binder is at least one selected from the group consisting of polyvinylidene fluoride (PVdF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene-butadiene rubber, and fluorine rubber.

12. An anode comprising the anode active material composition of claim 8.

13. A lithium secondary battery comprising the anode of claim 12.

14. A battery module comprising the lithium secondary battery of claim 13 as a unit cell.

15. A battery pack comprising the battery module of claim 14.

16. The anode active material of claim 1, wherein the anode active material is a bimodal type anode active material.

* * * * *